US008115863B2

(12) United States Patent
Hayner et al.

(10) Patent No.: US 8,115,863 B2
(45) Date of Patent: Feb. 14, 2012

(54) VIDEO DE-INTERLACER USING PIXEL TRAJECTORY

(75) Inventors: David A. Hayner, Austin, TX (US); Honglin Sun, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1181 days.

(21) Appl. No.: 11/696,610

(22) Filed: Apr. 4, 2007

(65) Prior Publication Data
US 2008/0246876 A1 Oct. 9, 2008

(51) Int. Cl.
*H04N 7/01* (2006.01)
*H04N 5/14* (2006.01)
*H04B 1/66* (2006.01)
*H03D 3/24* (2006.01)

(52) U.S. Cl. ........ 348/448; 348/441; 348/459; 348/699; 375/240.16; 375/376

(58) Field of Classification Search .................. None
See application file for complete search history.

(56) References Cited

U.S. PATENT DOCUMENTS

| | | | |
|---|---|---|---|
| 4,669,100 A | 5/1987 | Slotboom et al. | |
| 4,800,436 A | 1/1989 | Polaert et al. | |
| 4,992,982 A | 2/1991 | Steenhof | |
| 4,998,153 A | 3/1991 | Kuyk et al. | |
| 5,101,403 A | 3/1992 | Balzano | |
| 5,191,576 A | 3/1993 | Pommier et al. | |
| 5,436,663 A | 7/1995 | Guede | |
| 5,563,651 A | 10/1996 | Christopher et al. | |
| 5,689,301 A | 11/1997 | Christopher et al. | |
| 5,784,115 A | 7/1998 | Bozdagi | |
| 6,034,733 A | 3/2000 | Balram | |
| 6,108,047 A | 8/2000 | Chen | |
| 6,239,842 B1 | 5/2001 | Segman | |
| 6,226,092 B1 | 7/2001 | Wang et al. | |
| 6,269,484 B1 | 7/2001 | Simsic et al. | |
| 6,317,165 B1 | 11/2001 | Balram et al. | |
| 6,442,203 B1 * | 8/2002 | Demos | 375/240.16 |
| 6,456,329 B1 | 9/2002 | Tinker et al. | |
| 6,473,460 B1 * | 10/2002 | Topper | 375/240.16 |
| 6,480,231 B1 | 11/2002 | Bernstein | |
| 6,507,368 B1 | 1/2003 | Sakashita | |
| 6,542,196 B1 | 4/2003 | Watkins | |
| 6,556,193 B1 | 4/2003 | Auld et al. | |
| 6,618,094 B1 | 9/2003 | De Haan | |
| 6,661,464 B1 | 12/2003 | Kokkosoulis | |
| 6,700,623 B1 | 3/2004 | Weston | |
| 6,711,230 B1 * | 3/2004 | Nicholls et al. | 375/376 |
| 6,728,317 B1 | 4/2004 | Demos | |
| 6,799,168 B1 | 9/2004 | He et al. | |
| 6,847,405 B2 | 1/2005 | Hsu et al. | |

(Continued)

*Primary Examiner* — Jefferey Harold
*Assistant Examiner* — Sean Haiem
(74) *Attorney, Agent, or Firm* — Gary R. Stanford (57) ABSTRACT

A method of de-interlacing interlaced video information including determining functional equations which estimate trajectories of corresponding pixel locations based on statistical information, updating each functional equation with sampled pixel values from the interlaced video information of corresponding pixel locations, and evaluating the functional equations at a time point of a progressive frame and providing corresponding progressive pixel values. A video de-interlace system including a trajectory estimator and a component estimator. The trajectory estimator provides functional equations estimating trajectories of tracked pixel locations based on statistical information. The component estimator receives the functional equations and the interlaced video information and provides progressive pixel values. The component estimator updates each functional equation with sampled pixel values from the interlaced video information, and evaluates the updated functional equations at selected time points to provide progressive frames.

22 Claims, 5 Drawing Sheets

U.S. PATENT DOCUMENTS

| | | |
|---|---|---|
| 6,891,571 B2 | 5/2005 | Shin et al. |
| 6,894,726 B2 | 5/2005 | Carlsgaard |
| 6,900,846 B2 * | 5/2005 | Lee et al. ...................... 348/459 |
| 7,346,109 B2 * | 3/2008 | Nair et al. ................ 375/240.16 |

* cited by examiner

VIDEO DE-INTERLACER USING PIXEL TRAJECTORY

BACKGROUND OF THE INVENTION

1. Field of the Invention

This disclosure relates generally to video information processing, and more specifically, to a video de-interlacer which converts interlaced video information into progressive video information based on at least one pixel trajectory.

2. Description of the Related Art

The interlaced video format is widely used primarily because of the technology development of the video industry. The current generations of television (TV) standards, for example, are primarily based on the interlaced video format. The progressive video format, however, is preferred for the newer display technologies, such as liquid crystal display (LCD), plasma, digital light processing (DLP), etc. For progressive scan video information, the video is displayed line by line from top to bottom rather than by field. For interlaced scan, every other horizontal line of the video is displayed in separate fields and each frame is completed in two passes. In particular, each frame or picture is divided into two fields including an odd field and an even field, in which the odd and even fields are displayed one at a time in alternating fashion. Because interlaced video is composed of two fields that are captured at different moments in time, interlaced video frames exhibit motion artifacts when both fields are combined and displayed at the same moment and the video contains motion.

A de-interlacer is used to convert interlaced video into non-interlaced or progressive video for display. Many solutions exist for performing the de-interlacing function. The relatively unsophisticated solutions simply copy odd lines to even or vice-versa or display the odd and even fields together. If the de-interlacing function is not done properly, however, the displayed video contains a significant amount of visual artifacts especially when the video contains a significant amount of motion. It is desired to convert interlaced video into progressive scan video while ensuring a high level of visual quality.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
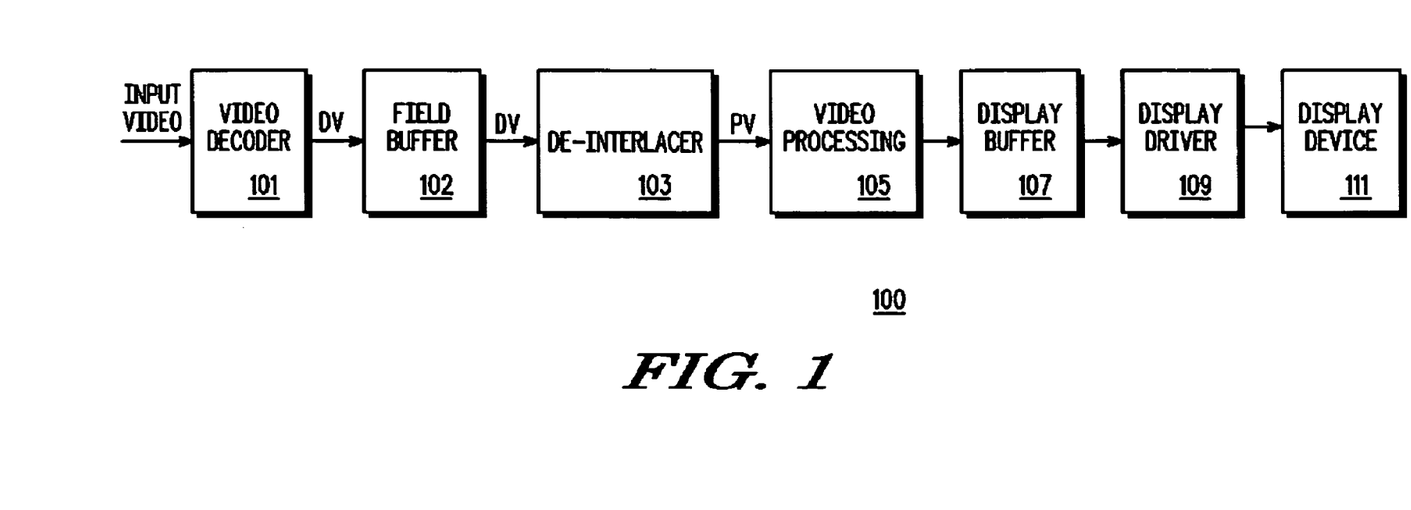
FIG. 1 is a block diagram of a video processing system implemented according to one embodiment.

FIG. 1 is a block diagram of a video processing system 100 implemented according to one embodiment. Encoded input video information, provided from an input bitstream or from a storage device or the like (not shown), is provided to a video decoder 101, which generates and stores decoded video (DV) information into a field buffer 102. The buffer 102 is referred to as a "field" buffer since the interlaced data is provided in fields. The DV information stored in the field buffer 102 is provided to a de-interlacer 103, which converts interlaced video information into progressive video (PV) information. The PV information is provided to video processing circuitry 105, which performs additional video processing functions on the PV information, such as scaling and color space conversion, and the like. The progressive video information is modified by the video processing circuitry 105 according to the additional video processing functions as known to those skilled in the art. For example, luminance (Y) and chrominance (CrCb) information (YCrCb) may be converted to red (R), green (G), blue (B) information (or RGB information) for display. The progressive video output of the video processing circuitry 105 is provided to a display buffer 107, which temporarily stores the progressive video information for display. A display driver 109 retrieves the progressive video information from the display buffer 107 for display on a display device 111, which is configured to display progressive scan video information. In the event that the encoded input video information is already in progressive scan format, then the de-interlacer 103 is either disabled or bypassed, so that the DV information from the video decoder 101 is provided directly as the PV information to the video processing circuit 105.

In the illustrated embodiment, the DV information is provided in YCrCb interlaced video format forming three (3) separate color channels, including Y, Cr, and Cb channels. Interlaced video includes an odd field and an even field collectively corresponding to each video frame of the video information. For the Y channel, each field has the same horizontal resolution as a video frame, but only half of the vertical resolution. This is due to the fact that each video field only holds either odd numbered or even numbered vertical scan lines of a video frame. The Cr and Cb fields are sampled at half the rate in both horizontal and vertical directions as compared to one field of the Y channel. The video fields, therefore, are categorized as odd fields and even fields. The refresh rate for the video fields is double that of the video frames. In this manner, each of the 3 channels of the interlaced DV information includes even and odd information (when interlaced). The Y channel contains luminance or "luma" component values which define the luminance of the color component and the Cr and Cb channels contain chrominance or "chroma" component values which incorporate information of color reconstruction. The Y channel has wider bandwidth as compared to the Cr and Cb channels. The Cr and Cb information is provided and processed in separate channels that are processed in substantially the same manner as compared to the Y channel information. The DV information incorporates actual measured points over temporal and spatial domains corrupted with noise. Although the embodiments described herein illustrate the YCrCb interlaced video format, the present invention applies to other video formats such as, for example, red, green, blue (RGB), video format.

Figure 2:
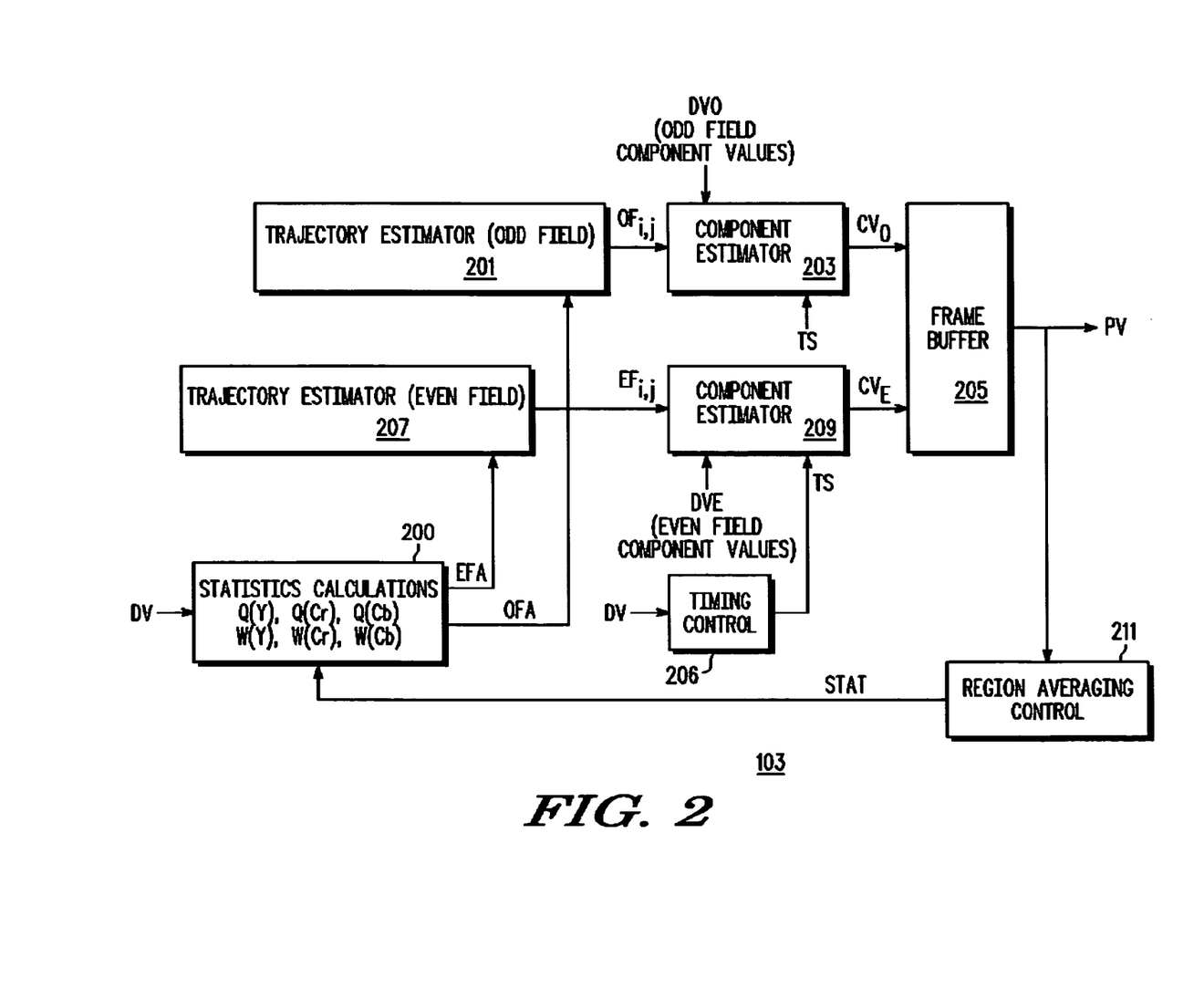
FIG. 2 is a block diagram of the de-interlacer of FIG. 1 according to an exemplary embodiment.

FIG. 2 is a block diagram of the de-interlacer 103 according to an exemplary embodiment. The DV information is provided to a statistics calculation circuit 200, which provides control parameters to update odd and even trajectory models within trajectory estimator circuits 201 and 207. In particular, the statistics calculation circuit 200 provides odd function adjust (OFA) information to the trajectory estimator circuit 201 for odd fields and provides even function adjust (EFA) to the trajectory estimator circuit 207 for even fields. Each of the trajectory estimator circuits 201 and 207 includes multiple trajectory estimators. As used herein, a pixel location is considered "tracked" when a trajectory estimator determines and updates a functional equation for that pixel location. The EFA and OFA information is used to adjust respective trajectory estimators and track the changes into the next progressive video frame. The DV information includes odd field component values DVO used by the statistics calculation circuit 200 to provide and update the OFA information, and includes even field component values DVE used by the statistics calculation circuit 200 to provide and update the EFA information. The statistics calculation circuit 200 updates statistics information, such as mean and variance information and the like, based on the input DV information and additional feedback statistical (STAT) information, further described below. The updated statistics information is used to update the EFA and OFA information.

In one embodiment, the trajectory estimator circuits 201 and 207 include Kalman filters that are based on Kalman filtering concepts. Kalman filters estimate states of the system while minimizing the mean square error between the true, but unknown states and the estimated states. In an alternative embodiment, H-Infinity (or $H_\infty$) filters are employed which minimize the maximum possible error of the signal. In yet another embodiment, a combination of both Kalman and H-Infinity filters are used. In any case, the filters represent a state-space model of the pixel trajectories, which information is used with known values at specific points in time and space to estimate the values of the trajectories at other points along the trajectories. The states of the system refer to mathematical descriptions of the physical processes underlying the sequence of images comprising the video stream and the video capture and processing systems. As an example, a trajectory of pixel values measured in successive fields at particular points in time according to interlaced format may be used to estimate pixel values for progressive frames at the same or different points in time. Furthermore, pixel values measured in successive odd fields may be used to estimate the value of the pixels in corresponding even frames and vice-versa. Each trajectory estimator develops a functional equation that is used to estimate a corresponding trajectory of pixel values at a specific pixel location, which is used to estimate the pixel value at non-sampled points in time along the trajectory. A trajectory represents how a pixel value changes over time. The trajectory estimator circuits 201 and 207 incorporate system model information from video capture to display and generate best estimates of the trajectories of the pixels. The system model also incorporates information of the statistics of the noise of the system in order to estimate and minimize the noise. The actual data is measured and constantly monitored to generate estimates of noise parameters. There are known statistics, for example, concerning the color properties of materials and this information is used in the design of the trajectory estimators 201 and 207 and resulting functional equations $OF_{i,j}$ and $EF_{i,j}$.

Each trajectory estimator of the trajectory estimator circuit 201 is a model based on statistical information which leverages the inherent kinematic nature of motion to develop a corresponding one of multiple functional equations $OF_{i,j}$ provided to inputs of a component estimator 203. Each equation is represented by a set of numbers, such as a set of coefficients of a selected filter or a polynomial or the like. The subscripts "i" and "j" denote row and column indices of a matrix of functional equations provided to the component estimator 203. The component estimator 203 receives the $OF_{i,j}$ equations, and driven by the DVO information, evaluates each equation $OF_{i,j}$ provided from the trajectory estimator circuit 201 at points in time not explicitly provided within the DVO information to accurately reconstruct a portion of the progressive video sequence. The resulting component values made by the component estimator 203 are provided as odd component values $CV_O$ provided and stored within a frame buffer 205. A timing control function 206 is shown which monitors the DV information to derive timing information used to develop time sample (TS) information provided to the component estimator 203 to ensure coherent information of the progressive frames. The timing control function 206, if included, may be implemented as a separate control circuit or distributed within the primary functional blocks of the system. The component estimator 203 uses the TS information to determine at which points in time to evaluate the functional equations $OF_{i,j}$ to estimate the pixel values of the progressive information.

In a similar manner, the trajectory estimator circuit 207 includes multiple trajectory estimators, each tracking the trajectory of a selected pixel location of the even field over multiple frames of video information. Each trajectory estimator of the trajectory estimator circuit 207 is a model based on statistical information which leverages the inherent kinematic nature of motion to develop a corresponding one of multiple equations $EF_{i,j}$ provided to inputs of another component estimator 209. Again, each equation is represented by a set of numbers (filter coefficients, polynomials, etc.) and a matrix of functional equations are provided to the component estimator 209. The component estimator 209 receives the $EF_{i,j}$ equations, and driven by the DVE information, evaluates each functional equation $EF_{i,j}$ provided from the trajectory estimator circuit 207 at points in time not explicitly provided within the DVE information to accurately reconstruct a remaining portion of the progressive video sequence. The resulting component values made by the component estimator 209 are provided as even component values $CV_E$ provided and stored within the frame buffer 205. The component estimator 209 uses the TS information from the timing control function 206 to determine at which points in time to evaluate the functional equations $EF_{i,j}$ to estimate the pixel values of the progressive information. Each set of collective values $CV_O$ and $CV_E$ are coincident in time to provide a corresponding progressive frame stored in the frame buffer 205 and output as the PV information.

The sequence of progressive frames captured in the frame buffer 205 is monitored by a region averaging control circuit 211. Region averaging is a method to generate an average trajectory over a selected number of pixels within specific regions of the progressive frames, which averaged information is used to generate statistical information used to update the model upon which the trajectories are based. The region averaging control circuit 211 collects information on the quality of the progressive frames and provides the STAT information to the statistics calculation circuit 200. The STAT information may include, for example, mean pixel values and/or deviations, etc., which may reflect changing statistics in portions of the frames. It is noted that the trajectory estimator circuits 201 and 207 initially incorporate default model information. As additional DV information is received and processed, the region averaging control and statistics calculation circuits 211 and 200 update the statistical information and adjust the model information of the trajectory estimators 201 and 207 to improve the estimations and minimize noise effects to optimize visual quality of the PV information. In this manner, the intensity of selected pixels is tracked over time and the inherent kinematic nature of motion is leveraged to accurately predict the value of the pixels at points in time not explicitly sampled. This process is performed for both the even and odd fields of the interlaced DV information and combined to accurately reconstruct a progressive frame sequence.

In an alternative and somewhat simplified embodiment, the DV information is not provided to the statistics calculation circuit 200 and is only provided to the component estimators 203 and 209. The trajectory estimators 201 and 207 generate the functional equations based only on the statistical information. As actual video information is used to update the component values provided to the frame buffer, the feedback loop formed by the region averaging control circuit 211 and the statistics calculation circuit 200 updates the modeling of the trajectory estimators to improve data accuracy and visual quality over a relatively short period of time. In another alternative embodiment, the timing control circuit 206 is eliminated and predetermined timing information, such as predetermined timing offsets relative to the interlaced information, is used for the progressive frames.

Figure 3:
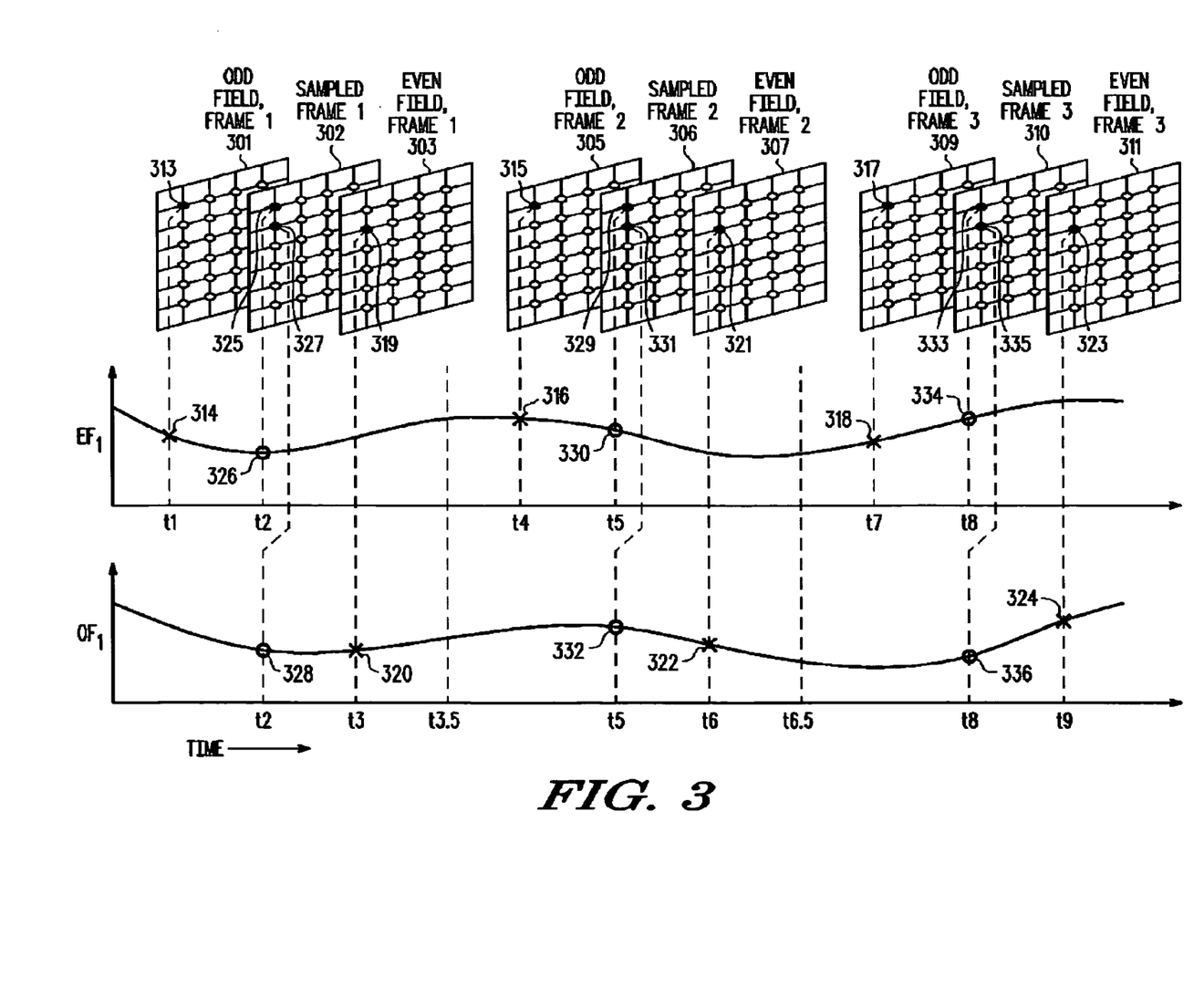
FIG. 3 is a figurative and graphic diagram illustrating exemplary operation of the trajectory estimator circuits and the component estimators of FIG. 2 according to one embodiment to reconstruct progressive frame information.

FIG. 3 is a figurative and graphic diagram illustrating exemplary operation of the trajectory estimator circuits 201 and 207 and the component estimators 203 and 209 according to one embodiment to reconstruct progressive frame information. The DV information is provided as a series of pixel component values of odd and even fields of multiple interlaced frames of a video sequence ultimately for display on the display device 111. As shown, the DV information includes an odd field 301 of a first frame or frame 1, followed by a corresponding even field 303 of frame 1, followed by a second odd field 305 of a second frame 2, followed by a corresponding field 307 of frame 2, followed by a third odd field 309 of a third frame 3, followed by a corresponding field 311 of frame 3, and so on. In the particular embodiment illustrated, the trajectory estimator circuit 201 tracks an approximation of the time-varying value of an upper left pixel of each of the odd fields 301, 305, 309, etc. In particular, the upper left pixel of the first odd field 301 is a pixel 313, the upper left pixel of the second odd field 305 is a pixel 315, the upper left pixel of the third odd field 309 is a pixel 317, and so on. Statistics derived from the intensity values of the consecutive odd pixels 313, 315, 317, etc., are used by the trajectory estimator circuit 201 to help develop a first function $OF_1$, which is shown plotted versus time (t) on a first graph when driven with the available samples 313, 315 and 317. As shown, the values of the pixels 313, 315 and 317 are shown plotted as pixel values 314, 316 and 318 plotted at respective times t1, t4 and t7, respectively. In a similar manner, the trajectory estimator circuit 207 tracks an approximation of the time-varying value of an upper left pixel of each of the even fields 303, 307, 311, etc. In particular, the upper left pixel of the first even field 303 is a pixel 319, the upper left pixel of the second even field 307 is a pixel 321, the upper left pixel of the third even field 311 is a pixel 323, and so on. Statistics derived from the intensity values of the consecutive even pixels 319, 321, 323, etc., are used by the trajectory estimator circuit 207 to develop a second function $EF_1$, which is shown plotted versus time (t) on a second graph when driven with the values of the available pixels 319, 321 and 323. As shown, the values of the pixels 319, 321, and 323 are shown plotted as pixel values 320, 322 and 324 at times t3, t6 and t9, respectively. The trajectory estimators also use output error statistics and a priori knowledge concerning the behavior of video data.

The first and second functions $OF_1$ and $EF_1$ are provided to the component estimators 203 and 209, respectively, which evaluate the respective functions at selected times according to the TS information to develop progressive PV information. Since the sizes of the odd and even fields for each frame are approximately equal (having approximately equal number of pixel values), the time interval between the odd and even fields is approximately equal. The time t1 generally represents the starting time of the odd field 301 of the first frame 1, the time t3 represents the starting time of the following even field 303 of the first frame 1, the time t4 represents the starting time of the following odd field 305 of the second frame 2, and so on. The timing information along with the actual sampled points of each field of each frame are used to develop the corresponding functions $OF_{i,j}$ and $EF_{i,j}$. The component estimators 203 and 209 may select any arbitrary time, such as a time tx, and generate estimates of each of the functions $OF_{i,j}$ and $EF_{i,j}$ to plot the corresponding points at that time tx to generate a corresponding progressive frame at time tx.

For example, a time t2 is selected approximately half way between times t1 and t3. The time t2 and actual input values from the DVO and DVE information, are plugged into each of the respective functions $OF_{i,j}$ and $EF_{i,j}$ to determine each pixel value of a first sampled frame 302. As shown, the time t2 and values 313, 315, 317 (and possibly values prior to 313) are plugged into the function $OF_1$ to provide a value 326, which is used to reconstruct a corresponding pixel 325 of the frame 302. Also, the time t2 and values 320, 322, 324 (and possibly values prior to 320) are plugged into the function $EF_1$ to provide a value 328, which is used to reconstruct a corresponding pixel 327 of the frame 302. This process is repeated for each of the functions $OF_{i,j}$ and $EF_{i,j}$ to determine each pixel value of the first progressive frame 302. Since each of the pixel values are plotted for the same time t2, the frame 302 is a progressive frame effectively representing the combined content of the odd and even fields 301 and 303 of the interlaced information. In a similar manner, another time t5 is selected approximately half way between the times t4 and t6. The time t5 is plugged into the function $OF_1$ to determine a pixel value 330 used to determine a corresponding pixel 329, and the time t5 is plugged into the function $EF_1$ to determine a pixel value 332 used to determine a corresponding pixel 331 of a second sampled frame 306. The time t5 and values from the DVO and DVE information, respectively, are plugged into each of the functions $OF_{i,j}$ and $EF_{i,j}$ to develop a second progressive frame 306. Pixel values 334 and 336 are determined from the functions $OF_1$ and $EF_1$ in similar manner at a time t8 between times t7 and t9 to determine pixels 333 and 335, respectively, of a third progressive frame 310. Operation continues in this manner to convert the interlaced DV information to the progressive PV information.

It is appreciated that alternative times may be selected to generate the progressive frames. As an example, a first progressive frame may be determined by selecting a time t3.5 between times t3 and t4, a second progressive frame may be determined by selecting a time t6.5 between times t3 and t4, and so on. In one embodiment, the functions $OF_{i,j}$ and $EF_{i,j}$ are continuous so that progressive frames may be reconstructed at any selected times rather than at times selected half-way between actual sample points used to develop the functions. In another embodiment, the functions $OF_{i,j}$ and $EF_{i,j}$ are configured to minimize error of predictions at particular points in time, such as selected successive time points for the progressive frames.

In one embodiment, every pixel location of the input DV information is tracked and converted to a corresponding equation used to determine the pixel values of the progressive frames. Such comprehensive tracking every pixel location of the interlaced frames provides optimal visual quality at the potential cost of increased computational complexity of the trajectory estimator circuits 201 and 207 and component estimators 203 and 209. In an alternative embodiment, a subset of the pixel locations is tracked and the pixel values of the remaining pixel locations are estimated or interpolated. Tracking a subset reduces the tracking and trajectory estimator calculations to reduce overall computational complexity while maintaining an acceptable or suitable level of visual quality of the progressive information.

Figure 4:
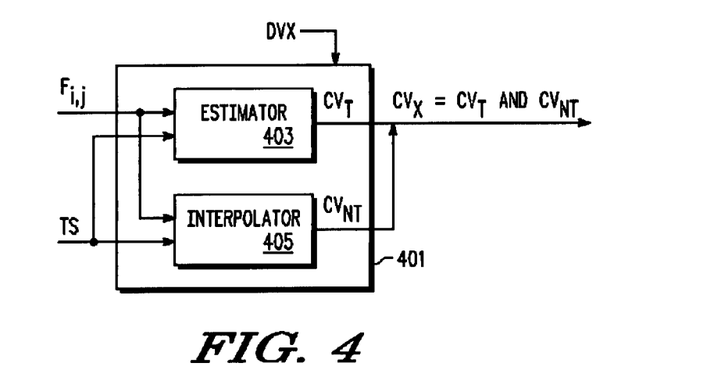
FIG. 4 is a block diagram illustrating a component estimator according to an embodiment in which a subset of pixel locations are tracked and remaining pixel values of pixel locations that are not tracked are determined by interpolation.

FIG. 4 is a block diagram illustrating a component estimator 401 according to an embodiment in which a subset of pixel locations are tracked and remaining pixel values of pixel locations that are not tracked are determined by interpolation. The component estimator 401 may be used as either the component estimator 203 for estimating pixel values within the odd field or the component estimator 209 for estimating pixel values within the even field. The component estimator 401 receives corresponding DVX information representing either the DVO or the DVE information depending upon which field is being estimated for the progressive frame. A set of functional equations $F_{i,j}$ represents either the functional equations $OF_{i,j}$ for the odd field and $EF_{i,j}$ for the even field. The time stamp TS information and the functional equations $F_{i,j}$ are provided to an estimator 403 and an interpolator 405. The estimator 403 plugs sampled pixel values from the DVX information into corresponding ones of the functional equations $F_{i,j}$ to generate a set of component values $CV_T$. In particular, each functional equation is determined for one pixel location, and subsequent and/or previous sampled pixel values of that same pixel location are plugged into the corresponding functional equation to adjust the functional equation, and then functional equation is evaluated at a point in time for the progressive frame to generate a corresponding one of the component values $CV_T$. The process is repeated for each tracked pixel location. The component values $CV_T$ are a subset of a complete set of component values $CV_X$ for the associated field, since the functional equations $F_{i,j}$ represent only a subset of the complete set of pixel values for the respective field. In this manner, the set of component values $CV_T$ provided by the estimator 403 includes only those component values associated with tracked pixel value locations.

The interpolator 405 determines the remaining pixel values of the field for pixel locations that are not tracked and provides corresponding component values $CV_{NT}$. The interpolator 405 operates in a similar manner as the estimator 403 by plugging sampled pixel values from the DVX information into the functional equations to provide pixel values for the pixel locations that are not tracked. In one embodiment, the interpolator 405 plugs the sampled pixel values of a non-tracked pixel location, or target pixel location, into two or more equations of correlated tracked pixel locations and interpolates or averages the results based on a weighting function. In other words, the sampled pixel values for the target pixel location is plugged into two or more functional equations of correlated tracked pixel locations, and then each equation is evaluated at the appropriate point in time for the corresponding progressive frame. The multiple results are applied to a weighting function to derive a corresponding $CV_T$ value. The process is repeated for each pixel location that is not tracked. The component values $CV_T$ and $CV_{NT}$ collectively provide the complete set of component values $CV_X$ for the associated field provided to the frame buffer 205. In this manner, progressive pixel values of tracked pixel locations are estimated from the functional equations evaluated with sampled interlaced pixel values for those tracked pixel locations, and remaining progressive pixel values of pixel locations that are not tracked are determined by evaluating multiple nearby functional equations with interlaced pixel values of each non-tracked pixel location and interpolating the results. The most closely correlated functional equations may be based on various factors. In one embodiment, correlation is determined by relative proximity from a non-tracked pixel location, such as a predetermined distance or number of pixel locations. Proximity correlation may be adjusted based on relative motion around the non-tracked pixel location.

Figure 5:
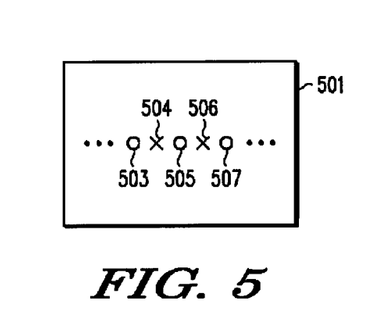
FIG. 5 is a figurative diagram of a tracking field representing either one of the odd or even fields in which every other pixel location is tracked for each line in each field.

FIG. 5 is a figurative diagram of a tracking field 501 representing either one of the odd or even fields in which every other pixel location is tracked for each line in each field. A circle symbol "o" is used to represent tracked pixel locations and an "x" symbol is used to represent pixel locations that are not tracked. As shown, for example, the tracking field 501 illustrates a selected horizontal line of pixel locations including pixel locations 503, 504, 505, 506 and 507. In this case, every other pixel location, including pixel locations 503, 505, 507, is tracked by the associated trajectory estimator whereas the intermediate pixel locations, including the pixel locations 504 and 506, are not tracked. If the component estimator 401 is used, the estimator 403 estimates pixel values for each of the tracked pixel locations, including the pixel locations 503, 505 and 507, using corresponding functional equations and actual pixel values for those locations from the DVX information. The updated function equations are evaluated at the progressive frame time to estimate each pixel value of the $CV_T$ information. For each pixel location that is not tracked, the interpolator 405 updates the most closely correlated functional equations of the tracked pixel locations with the DVX information of then non-tracked pixel locations and evaluates each at the progressive frame time. This results in multiple correlated pixel values. In one embodiment, the results may be averaged together to provide a pixel value for the non-tracked pixel location. In another embodiment, a weighting function is applied to the results to interpolate a pixel value for the non-tracked pixel location. The weighting function may be linear or non-linear, such as logarithmic or the like.

For example, the functional equations associated with the tracked pixel locations 503 and 505 may be used to interpolate pixel values for the non-tracked pixel location 504. The sampled pixel values in the DVX information for the pixel location 504 are plugged into the functional equations of pixel locations 503 and 505, the TS information is used to estimate corresponding pixel values, and the results are averaged or weighted to interpolate a pixel value for the pixel location 504 for the corresponding progressive frame. In this case, since the pixel value 504 is half-way between the pixel values 503 and 505, an averaging function may be suitable or a weighting function that applies equal weighting factors. A similar procedure is used to estimate pixel values for the non-tracked pixel location 506 by correlating the tracked information associated with the tracked pixel locations 505 and 507.

Figure 6:
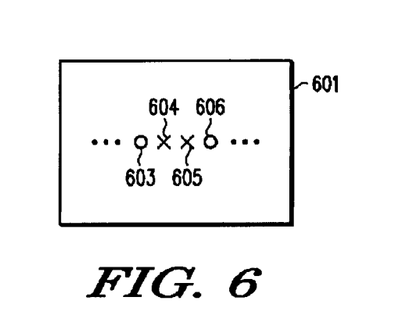
FIG. 6 is a figurative diagram of a tracking field representing either one of the odd or even fields in which multiple consecutive pixel locations are not tracked for each line in each field.

FIG. 6 is a figurative diagram of a tracking field 601 representing either one of the odd or even fields in which multiple consecutive pixel locations are not tracked for each line in each field. As shown, for example, the tracking field 601 illustrates a selected horizontal line of pixel locations including pixel locations 603, 604, 605 and 606. In this case, the pixel locations 603 and 606 are tracked whereas the intermediate pixel locations 604 and 605 are not tracked, so that less than half the pixel locations are tracked in the line. If the component estimator 401 is used, the estimator 403 estimates pixel values for each of the tracked pixel locations using corresponding functional equations and actual sampled data for those pixel locations to generate the $CV_T$ information in a similar manner as previously described. In one embodiment, the interpolator 405 applies the data for each non-tracked pixel location to each of the most closely correlated functional equations of the tracked pixel locations, estimates a pixel value for each at the progressive frame time, and combines the results to generate the $CV_{NT}$ information. The results may be combined using an averaging or weighting function or the like.

The interpolation procedure for interpolating the equations for the non-tracked pixel locations 604 and 605 is similar to that described above for the pixel locations 504 and 506 of the tracking field 501. In this case, however, the pixel location 603 may be deemed more closely correlated with the pixel location 604 than the pixel location 606. Similarly, the pixel location 606 is deemed more closely correlated with the pixel location 605 than the pixel location 603. In one embodiment, a weighting function or the like is used during the interpolation process to more heavily weight the functional equation that is more closely correlated to each tracked pixel location. The data for the pixel location 604 is plugged into the functional equations for the pixel locations 603 and 606, the equations are evaluated at the progressive frame time, and the results are weighted to determine a pixel value of the pixel location 604. In this case, the resulting pixel value for the pixel location 603 is given a greater weight than the resulting pixel value for the pixel location 606 for interpolating the results for the pixel location 604. In a similar manner, the results for the pixel location 606 are given a greater weight than the results for the pixel location 603 for interpolating the functional equation for the pixel location 606.

Figure 7:
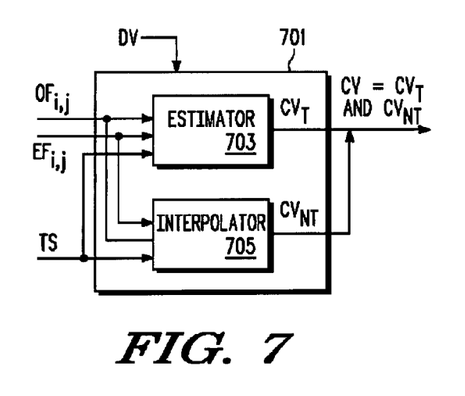
FIG. 7 is a block diagram illustrating a component estimator according to another embodiment in which a subset of pixel lines are tracked and remaining pixel values that are not tracked are determined by interpolation.

FIG. 7 is a block diagram illustrating a component estimator 701 according to another embodiment in which a subset of pixel lines are tracked and remaining pixel values that are not tracked are determined by interpolation. In this case, the component estimator 701 receives the DV information and represents a combination of the component estimators 203 and 209 for estimating pixel values for both the odd and even fields. The TS information and the functional equations $OF_{i,j}$ and $EF_{i,j}$ are provided to an estimator 703 and to an interpolator 705. The estimator 703 evaluates each of the functional equations as previously described to generate a set of component values $CV_T$, which is a subset of a complete set of component values CV for each frame. The interpolator 705 interpolates and estimates pixel values of remaining pixel locations of each frame that are not tracked and provides corresponding component values $CV_{NT}$. The component values $CV_T$ and $CV_{NT}$ collectively provide a complete set of component values CV for each frame provided to the frame buffer 205. The estimator 703 operates in substantially the same manner as the estimator 403 for determining pixel values for the pixel locations that are tracked for both even and odd fields. The interpolator 705 operates in substantially the same manner as the interpolator 405 except that interpolation is performed for both even and odd fields for each frame.

Figure 8:
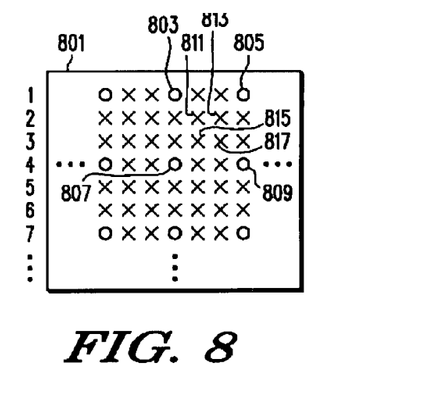
FIG. 8 is a figurative diagram of a tracking frame in which about one-third the pixel locations of every third horizontal line are tracked and remaining pixel values are determined by interpolating the tracked information.

FIG. 8 is a figurative diagram of a tracking frame 801 in which about one-third the pixel locations of every third horizontal line are tracked and remaining pixel values are determined by interpolating the tracked information. In this case, the pixel locations of the first few lines of the tracking frame 801 are shown. A portion of each of lines 1, 3, 5 and 7 of the odd field are shown and a portion of each of the lines 2, 4 and 6 of the even field are shown within the tracking frame 801. The pattern of tracked pixels for lines that are tracked is similar as that shown for the tracking field 601 in which two pixel locations are skipped between tracked pixel locations. Furthermore, intermediate pairs of lines are skipped entirely and not tracked. In one embodiment, pixel values of pixel locations within each line that is not tracked are interpolated and estimated in a similar manner as previously described. As shown, pixel locations 803 and 805 in line 1 are tracked and pixel locations 807 and 809 in line 4 are tracked, whereas intermediate pixel locations 811 and 813 on line 2 and intermediate pixel locations 815 and 817 on line 3 are not tracked.

The pixel values of the tracked pixel locations 803, 805, 807 and 809 are determined by evaluating the functional equations and estimating pixel values in a similar manner as previously described. The pixel values of each pixel location that is not tracked within each line that has tracked pixel locations may be determined in a similar manner as described above for the tracking field 601. In particular, the pixel values of the pixel locations between pixel locations 803 and 805 on the same line 1 and the pixel values of the pixel locations between pixel locations 807 and 809 of line 4 are interpolated and estimated in the same manner as previously described. The same procedure may be followed to interpolate and estimate the pixel values of non-tracked pixel locations in the vertical direction. In this manner, the intermediate non-tracked pixel locations in the same vertical lines between pixel locations 803 and 807 and between pixel locations 805 and 809 (i.e., on lines 2 and 3) may be determined by estimating and interpolating pixel values in substantially the same manner as described for the horizontal lines except in the vertical direction.

The pixel values for the intermediate pixel locations 811, 813, 815 and 817 of each progressive frame are interpolated in a similar manner as previously described except using information from both the odd and fields. The tracked pixel locations 803, 805, 807 and 809 surrounding the non-tracked pixel locations 811, 813, 815 and 817 may be used to interpolate the pixel values. Also, the pixel location 811 is more closely correlated with the pixel location 803 and thus has the highest weighting factor as compared with the pixel locations 805, 807 and 809. The pixel locations 805 and 807 have the next highest correlation with the pixel location 811, and the pixel location 809 has the lowest correlation. In this manner, the sampled pixel data for the pixel location 811 is plugged into the functional equations of each of the pixel locations 803, 805, 807 and 809, and corresponding pixel values are estimated using the resulting equations. The four estimated values are then applied to a weighting scheme to interpolate a pixel value for the pixel location 811. The same process is performed for the pixel location 813, except using the sampled pixel values for pixel location 813 and adjusting the weighting factors accordingly. For example, the estimated pixel value associated with the pixel location 805 is given the highest relative priority, the estimated pixel value associated with the pixel locations 803 and 809 are given the next highest relative priority, and the estimated pixel value associated with the pixel location 807 is given the lowest relative priority.

Figure 9:
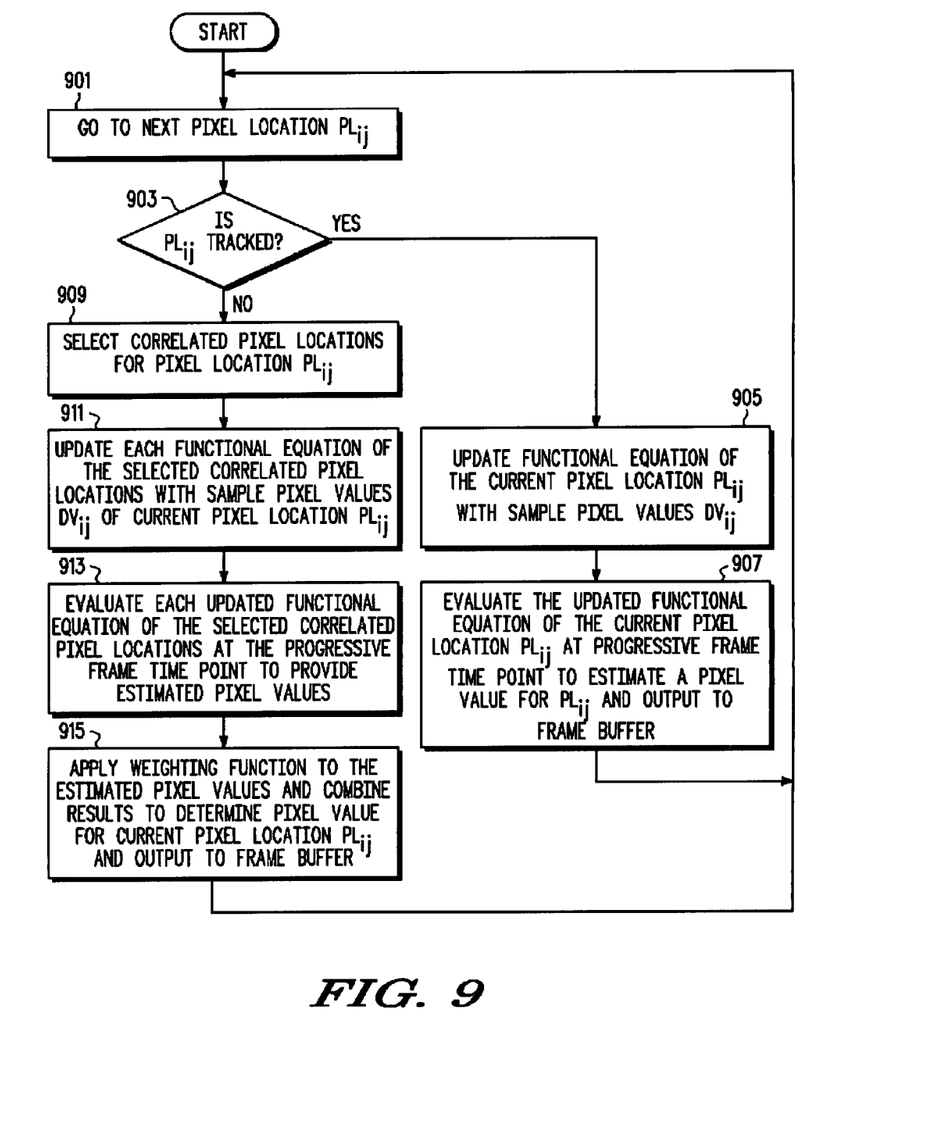
FIG. 9 is a flowchart diagram illustrating operation of a component estimator according to an exemplary embodiment.

FIG. 9 is a flowchart diagram illustrating operation of a component estimator according to an exemplary embodiment, including any of the component estimators 203, 209, 401 or 701. At first block 901 operation proceeds to the next pixel location $PL_{ij}$, which is either the next pixel location of a current frame or the first pixel location of a first frame or the next frame in the video sequence. The subscripts "i" and "j" refer to the column and row position, respectively, of the current pixel location. In one embodiment, the pixel locations are handled in order from left to right and from top to bottom for each progressive frame, although any alternative ordering is contemplated. Operation then proceeds to block 903 in which it is queried whether the current pixel location $PL_{ij}$ is a tracked location or not. A pixel location is considered "tracked" when a functional equation is determined by the corresponding trajectory estimator for the pixel location. If the pixel location $PL_{ij}$ is tracked, then operation proceeds to block 905 in which the corresponding functional equation for the current tracked pixel location is updated with sampled pixel values from the DV information, shown at $DV_{ij}$, corresponding to the pixel location $PL_{ij}$. Several embodiments are contemplated for updating each functional equation. In one embodiment, the field buffer 102 holds the latest odd and even fields and the latest sampled pixel value for the pixel location $PL_{ij}$ is used to update the functional equation. In another embodiment, the field buffer 102 holds multiple frames of information, so that "future" or subsequent and "past" or previous pixel values relative to the current frame being processed are available. For example, if the Mth frame is the current frame, the field buffer 102 holds the next frame M+1 in one embodiment (and frame M+2 in yet another embodiment and frames M−2, M−1, M, M+1 and M+2 in another embodiment) so that one or more subsequent or future sampled pixel values and one or more past or previous pixel values are available to update the functional equation while determining the pixel value for the current pixel location of the current frame M.

After the functional equation is updated at block 905, operation proceeds to next block 907 in which the updated functional equation of the current pixel location $PL_{ij}$ is evaluated at the point in time of the current progressive frame to estimate the pixel value for the current pixel location $PL_{ij}$ and the resulting estimated pixel value is output to the frame buffer 205. Operation then proceeds back to block 901 to process the next pixel location. In one embodiment, the timing control circuit 206 provides the TS information for the current progressive frame time point. In another embodiment, the progressive frame time points are selected at a predetermined offset relative to the interlaced fields of the DV information.

If the current pixel location $PL_{ij}$ is not a tracked location as determined at block 903, operation instead proceeds to block 909 in which pixel locations are selected that are correlated with the current pixel location $PL_{ij}$. For example, the pixel locations 503 and 505 are correlated with pixel location 504, the pixel locations 603 and 606 are correlated with pixel location 604, the pixel locations 803, 805, 807 and 809 are correlated with pixel locations 811, 813, 815 and 817, and so on. Operation proceeds to next block 911 in which the functional equations of the selected correlated pixel locations are each updated with the sampled pixel values $DV_{ij}$ of the pixel location $PL_{ij}$. In a similar manner described above with respect to block 905, the sampled pixel data may be provided from previous and/or subsequent frames. Operation then proceeds to next block 913 in which each of the updated functional equations are evaluated at the point in time of the current progressive frame to estimate a pixel value for each correlated pixel location. Operation then proceeds to block 915 in which a weighting function is applied to each estimated pixel value and the results are combined to determine a pixel value for the current pixel location $PL_{ij}$, and the resulting estimated pixel value is output to the frame buffer 205. The results may be combined by simply adding the weighted values together to achieve an estimated pixel value. Operation then proceeds back to block 901 to process the next pixel location.

A method of de-interlacing interlaced video information according to one embodiment includes determining functional equations which estimate trajectories of corresponding pixel locations based on statistical information, updating each functional equation with sampled pixel values from the interlaced video information of corresponding pixel locations, and evaluating the functional equations at a time point of a progressive frame and providing corresponding progressive pixel values.

The method may include determining a coefficient for each of at least one Kalman filter. The method may include determining a coefficient for each of at least one H-Infinity filter. The method may include estimating noise incorporated within the interlaced video information. The method may include determining the statistical information based on the interlaced video information. The method may include averaging information of a selected region of the progressive frame and providing averaged information, and updating the statistical information based on the averaged information.

The method may include tracking a subset of the pixel locations and interpolating a pixel location of the progressive frame that is not tracked based on tracked pixel locations. The method may include selecting from among the tracked pixel locations that are correlated with the pixel location that is not tracked. The interpolating may include updating a functional equation of each correlated pixel location with sampled pixel values of the pixel location that is not tracked from the interlaced video information, evaluating the updated functional equations at the time point of the progressive frame to provide correlated pixel values, and combining the correlated pixel values with a weighting function to provide a pixel value for the pixel location that is not tracked. The method may include selecting a tracked pixel location that is within a predetermined proximity of the pixel location that is not tracked. The functional equations may be determined and updated separately for odd and even fields of the interlaced video information.

A video de-interlace system according to one embodiment includes a trajectory estimator and a component estimator. The trajectory estimator has an output providing functional equations estimating trajectories of corresponding tracked pixel locations based on statistical information. The component estimator has a first input receiving the functional equations, a second input receiving interlaced video information, and an output providing progressive pixel values of a progressive frame. The component estimator updates each functional equation with corresponding sampled pixel values from the interlaced video information, and evaluates the updated functional equations at a time point of the progressive frame to provide the progressive pixel values.

The trajectory estimator may include at least one Kalman filter or at least one H-Infinity filter or a combination of both. The video de-interlace system may include a region averaging control circuit and a statistics calculation circuit. The region averaging control circuit has an input receiving the progressive pixel values and an output providing statistical adjust information. The statistics calculation circuit has an input coupled to the output of the region averaging control circuit and an output providing the statistical information. The statistics calculation circuit may further have an input receiving the interlaced video information for updating the statistical information.

The component estimator may be configured to select tracked pixel locations as correlated pixel locations that are correlated with a non-tracked pixel location, update a functional equation of each correlated pixel location with sampled pixel values from the interlaced video information corresponding to the non-tracked pixel location, evaluate updated functional equations at a time point of the progressive frame to provide correlated pixel values, and combine the correlated pixel values using a weighting function to determine a pixel value for the non-tracked pixel location. The component estimator may select the correlated pixel locations based on relative proximity to the non-tracked pixel location. The trajectory estimator may include odd field and even field trajectory estimators and the component estimator may include odd field and even field component estimators.

A de-interlacer according to one embodiment includes first and second trajectory estimators, first and second component estimators, a frame buffer, a region averaging control circuit and a statistics calculations circuit. The first and second trajectory estimators each have an input receiving corresponding statistical adjust information and an output providing a corresponding functional equations for a corresponding field estimating trajectories of corresponding tracked pixel locations of the corresponding field based on the corresponding statistical adjust information. The first and second component estimators each have a first input receiving corresponding functional equations, a second input receiving corresponding interlaced video information, and an output providing corresponding progressive pixel values. The frame buffer has receiving progressive pixel values from the component estimators and an output providing progressive video information. The region averaging control circuit has an input receiving the progressive video information and an output providing statistical information based on selected regions of the progressive video information. The statistics calculations circuit has a first input coupled to the output of the region averaging circuit and first and second outputs providing first and second statistical adjust information to the first and second trajectory estimators, respectively. The statistics calculations circuit may have an input receiving the interlaced video information. The trajectory estimators may each include Kalman filters or H-Infinity filters or a combination of both.

Although the invention is described herein with reference to specific embodiments, various modifications and changes can be made without departing from the scope of the present invention as set forth in the claims below. It should be understood that all circuitry or logic or functional blocks described herein may be implemented either in silicon or another semiconductor material or alternatively by software code representation of silicon or another semiconductor material. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of de-interlacing interlaced video information, comprising:
   determining a plurality of functional equations based on statistical information, wherein each of the plurality of functional equations estimates a corresponding one of a plurality of trajectories, and wherein each of the plurality of trajectories represents how a value of a corresponding one of a plurality of pixel locations changes over time;
   updating each of the plurality of functional equations with sampled pixel values from the interlaced video information of corresponding pixel locations; and
   evaluating the plurality of functional equations at a time point of a progressive frame and providing a corresponding plurality of progressive pixel values.

2. The method of claim 1, wherein said determining a plurality of functional equations comprises determining a coefficient for each of at least one Kalman filter.

3. The method of claim 1, wherein said determining a plurality of functional equations comprises determining a coefficient for each of at least one H-Infinity filter.

4. The method of claim 1, wherein said determining a plurality of functional equations comprises estimating noise incorporated within the interlaced video information.

5. The method of claim 1, further comprising determining the statistical information based on the interlaced video information.

6. The method of claim 1, further comprising:
   averaging information of a selected region of the progressive frame and providing averaged information; and
   updating the statistical information based on the averaged information.

7. The method of claim 1, further comprising:
   said determining comprising tracking a subset of the pixel locations; and
   interpolating a pixel location of the progressive frame that is not tracked based on tracked pixel locations.

8. The method of claim 7, further comprising:
   selecting a plurality of the tracked pixel locations that are correlated with the pixel location that is not tracked; and
   wherein said interpolating comprises:
      updating a functional equation of each correlated pixel location with sampled pixel values of the pixel location that is not tracked from the interlaced video information;
      evaluating the updated functional equations at the time point of the progressive frame to provide a plurality of correlated pixel values; and
      combining the plurality of correlated pixel values with a weighting function to provide a pixel value for the pixel location that is not tracked.

9. The method of claim 8, wherein said selecting comprises selecting a tracked pixel location that is within a predetermined proximity of the pixel location that is not tracked.

10. The method of claim 1, wherein:
said determining a plurality of functional equations comprises determining an odd set of functional equations for pixel locations within an odd field and determining an even set of functional equations for pixel locations within an even field; and
wherein said updating each of the plurality of functional equations comprises updating each of the odd set of functional equations with sampled pixel values for the odd field and updating each of the even set of functional equations with sampled pixel values for the even field.

11. A video de-interlace system, comprising:
a trajectory estimator having an output providing a plurality of functional equations based on statistical information, wherein each of said plurality of functional equations estimates a corresponding one of a plurality of trajectories, and wherein each of said plurality of trajectories represents how a value of a corresponding one of a plurality of pixel locations changes over time; and
a component estimator having a first input receiving said plurality of functional equations, a second input receiving interlaced video information, and an output providing a plurality of progressive pixel values of a progressive frame;
wherein said component estimator updates each of said plurality of functional equations with corresponding sampled pixel values from said interlaced video information and evaluates said updated plurality of functional equations at a time point of said progressive frame to provide said plurality of progressive pixel values.

12. The video de-interlace system of claim 11, wherein said trajectory estimator comprises at least one Kalman filter.

13. The video de-interlace system of claim 11, wherein said trajectory estimator comprises at least one H-Infinity filter.

14. The video de-interlace system of claim 11, further comprising:
a region averaging control circuit having an input receiving said plurality of progressive pixel values and an output providing statistical adjust information; and
a statistics calculation circuit having an input coupled to said output of said region averaging control circuit and an output providing said statistical information.

15. The video de-interlace system of claim 14, wherein said statistics calculation circuit has an input receiving said interlaced video information for updating said statistical information.

16. The video de-interlace system of claim 11, wherein said component estimator selects a plurality of said tracked pixel locations as correlated pixel locations that are correlated with a non-tracked pixel location, updates a functional equation of each said correlated pixel location with sampled pixel values from the interlaced video information corresponding to said non-tracked pixel location, evaluates updated functional equations at a time point of said progressive frame to provide a plurality of correlated pixel values, and combines said correlated pixel values using a weighting function to determine a pixel value for said non-tracked pixel location.

17. The video de-interlace system of claim 16, wherein said component estimator selects said correlated pixel locations based on relative proximity to said non-tracked pixel location.

18. The video de-interlace system of claim 11, wherein:
said trajectory estimator comprises:
an odd field trajectory estimator having an output providing a plurality of odd field functional equations estimating a plurality of trajectories of a corresponding plurality of tracked pixel locations within an odd field; and
an even field trajectory estimator having an output providing a plurality of functional equations estimating a plurality of trajectories of a corresponding plurality of tracked pixel locations within an even field; and
wherein said component estimator comprises:
an odd field component estimator having a first input receiving said plurality of odd field functional equations, a second input receiving odd field interlaced video information, and an output providing a plurality of odd field progressive pixel values; and
an even field component estimator having a first input receiving said plurality of even field functional equations, a second input receiving even field interlaced video information, and an output providing a plurality of even field progressive pixel values.

19. A de-interlacer, comprising:
a first trajectory estimator having an input receiving first statistical adjust information and an output providing a plurality of first functional equations for a first field based on said first statistical adjust information, wherein each of said plurality of first functional equations estimates a corresponding one of a plurality of first trajectories of said first field, and wherein each of said plurality of first trajectories represents how a value of a corresponding one of a plurality of first pixel locations of said first field changes over time;
a second trajectory estimator having an input receiving second statistical adjust information and an output providing a plurality of second functional equations for a second field based on said second statistical adjust information, wherein each of said plurality of second functional equations estimates a corresponding one of a plurality of second trajectories of said second field, and wherein each of said plurality of second trajectories represents how a value of a corresponding one of a plurality of second pixel locations of said second field changes over time;
a first component estimator having a first input receiving said plurality of first functional equations, a second input receiving first interlaced video information, and an output providing a first plurality of progressive pixel values;
a second component estimator having a first input receiving said plurality of second functional equations, a second input receiving second interlaced video information, and an output providing a second plurality of progressive pixel values;
a frame buffer having first and second inputs receiving said first and second pluralities of progressive pixel values and an output providing progressive video information;
a region averaging control circuit having an input receiving said progressive video information and an output providing statistical information based on selected regions of said progressive video information; and
a statistics calculations circuit having a first input coupled to said output of said region averaging circuit, a first output providing said first statistical adjust information, and a second output providing said second statistical adjust information.

20. The de-interlacer of claim 19, wherein said statistics calculations circuit has a second input receiving said first and second interlaced video information.

21. The de-interlacer of claim 19, wherein said first and second trajectory estimators each comprise a plurality of Kalman filters.

22. The de-interlacer of claim 19, wherein said first and second trajectory estimators each comprise a plurality of H-Infinity filters.

* * * * *